United States Patent [19]

Lyons

[11] Patent Number: 4,627,462

[45] Date of Patent: Dec. 9, 1986

[54] SELECTABLE FUNCTION VALVE DEVICE

[75] Inventor: Michael D. Lyons, Lexington, Ky.

[73] Assignee: American Standard Inc., Lexington, Ky.

[21] Appl. No.: 481,192

[22] Filed: Apr. 1, 1983

[51] Int. Cl.[4] .............................................. F15B 13/04
[52] U.S. Cl. .................................. 137/270; 137/625.66
[58] Field of Search ................ 137/270, 625.66, 625.2, 137/269, 269.5, 270.5, 271

[56] References Cited

U.S. PATENT DOCUMENTS

| | | | |
|---|---|---|---|
| 3,183,926 | 5/1965 | Boudot | 137/270 |
| 3,298,460 | 1/1967 | Porter et al. | 137/270 |
| 3,411,525 | 11/1968 | Auger | 137/270 |
| 3,722,531 | 3/1973 | Verhart | 137/271 |

FOREIGN PATENT DOCUMENTS

| | | | |
|---|---|---|---|
| 852532 | 9/1970 | Canada | 137/270 |
| 944256 | 3/1974 | Canada | 137/270 |
| 194787 | 8/1906 | Fed. Rep. of Germany | 137/270 |
| 2038898 | 2/1972 | Fed. Rep. of Germany | 137/270 |
| 1072141 | 6/1967 | United Kingdom | 137/270 |

*Primary Examiner*—Henry Bennett
*Attorney, Agent, or Firm*—G. P. Baier

[57] ABSTRACT

A multiposition valve having a dynamic slide plate with at least one cavity is provided with a stationary plate intermediate such dynamic plate. The stationary plate has a plurality of through-bores for providing fluid connection to fluid passageways in the valve housing. The stationary plate can be inverted to selectively provide a variety of valve functions for any given dynamic valve plate position.

14 Claims, 8 Drawing Figures

SELECTABLE FUNCTION VALVE DEVICE

This invention relates to a multiple-position fluid valve in which the function of a given position can be selected by the prearrangement of internal valve parts.

In fluid valves of the type having a slide plate, the valve function is determined by the design of the specific slide plate and its relationship to the corresponding bores in a stationary portion of the valve. The relationship between cavities or ports in the slide plate relative to the corresponding cavities or bores in the stationary portion restrict the valve to a specific function. Should a different valve function be desired, it is necessary to substitute a new slide plate or fixed portion which corresponds to the desired new function. In manufacturing, this results in the necessity to fuild and stock many different designs of slide plates or stationary portions to fulfill the requirements of users. Users of such valves, in turn, must stock a wide variety of valves to provide all of the logic functions which are normally required by the various applications to which said valves are used. Once a valve is installed in a specific application, its function is generally fixed by its internal parts and any deviation from the initial function requires that the valve unit be replaced with a new and different model. The lack of flexibility and necessity to keep high inventory levels of different types of valves is a problem, especially in the area of fluid control valves, where a large number of different logic functions are desired.

The object of this invention is to provide a valve device in which a variety of valve functions can be achieved by the specific arrangement of internal parts. In addition, assembled valves can readily be modified without the need for any additional component parts to change the valve function.

I provide for a valve in which different valve positions are achieved through the relative sliding orientation between a movable plate and a stationary plate, and in which the specific function of a given position can be altered by merely rotating or flipping one of the plates. This permits a single set of parts to be assembled into a valve having various desired functions at any given valve position.

Other objects and features of the invention will become apparent to those skilled in the art as details of presently preferred embodiments are described with reference to the following drawings.

Figure 1:
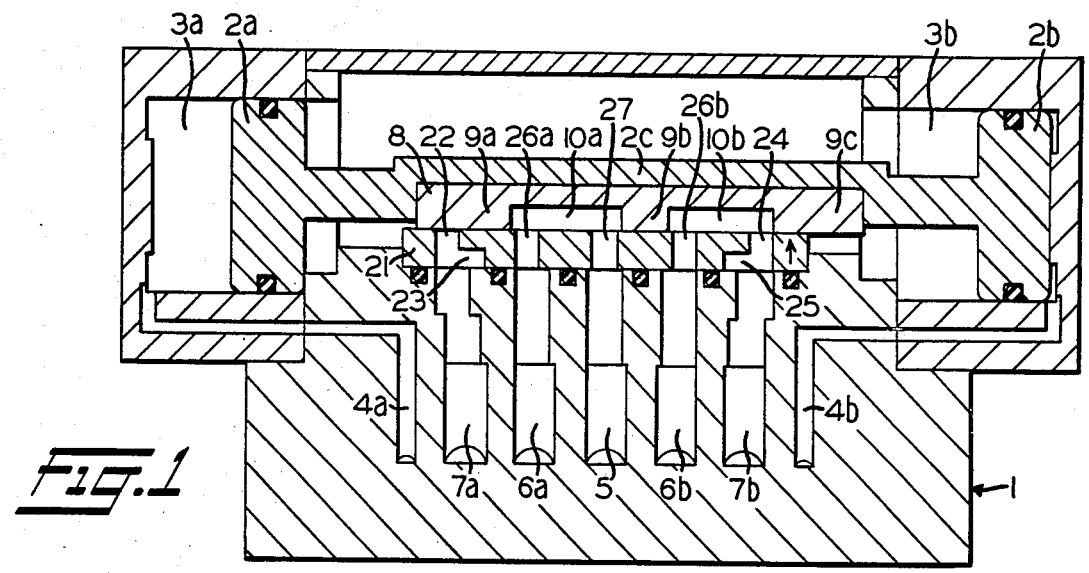
FIG. 1 is a cross-sectional view of a fluid-operated, two-position, directional control valve with a center-off position.

Referring now to FIG. 1, there is shown a presently preferred embodiment in an air-operated control valve. It is to be understood that the invention can also be used in electrically, hydraulically, manually, or other type of valve operation. FIG. 1 shows a housing 1 having operating means using two reciprocally mounted pirtons 2A and 2B in respective pressure chambers 3A and 3B. Pistons 2A and 2B are rigidly connected by a center portion or channel 2C, such that the pistons and channel 2 move axially within housing 1 as one integral unit. Control pressure lines 4A and 4B supply pressurized fluid, such as, for example, air, to respective chambers 3A and 3B. Biasing means (not shown), such as coiled springs, are used to maintain the piston assembly of 2A, 2B and 2C in a center position with each piston 2A and 2B approximately in the center of their respective chambers 3A and 3B. Control fluid pressure is alternatively directed to either control line 4A or 4B, depending L on the desired position of the control valve. When fluid pressure is directed into line 4A and then into chamber 3A, the piston assembly of 2A, 2B and 2C is moved rightward with respect to FIG. 3. When such pressure in control line 4A is relieved, the biasing springs (not shown) return the piston assembly 2A, 2B and 2C to a center position. Conversely, when fluid pressure is directed only to control line 4B and thereby fed into chamber 3B, the piston assembly 2A, 2B and 2C translates to a full leftward axial position, and when such pressure is exhausted, the spring means returns the piston assembly 2 to a center position. Mounted within the piston assembly center portion 2C is a dynamic plate 8 which slides or moves axially with the piston assembly 2. This dynamic plate is mounted within a downward opening channel of the center piston portion 2C so that the plate 8 can easily be assembled or removed. As shown in FIG. 1, mounted adjacent to the dynamic plate 8 is a stationary plate 21, having one side in sliding contact with the dynamic plate 8. The stationary plate, as shown, has five through-bores which connect to five respective passageways 7A, 7B, 6A, 6B and 5. These passageways, in a typical application, would lead to other fluid logic devices or to fluid-operated devices which are to be controlled. One such application would be a bidirectional fluid-operated cylinder used as a linear actuator. In such example, inlet passageway 5 would connect to a source of fluid pressure, outlet passageways 6A and 6B would respectively connect to opposite sides of the piston in such a double-acting cylinder, and exhaust passageways 7A and 7B Would lead to exhaust chambers. Dynamic plate 8 has two cavities 10A and 10B, which provide fluid interconnection between selected pairs of adjacent through-bores in the stationary plate 21. Lands 9A, 9B and 9C on the lower surface portion of the dynamic plate 8 respectively block off, seal, or cover over adjacent through-bores in the stationary plate 21. As an example of the operation of the device shown in FIG. 1, if a high pressure fluid source is fed into the inlet passageway 5, passing through the through-bore 27 into cavity 10A, then the flow is directed downward into through-bore 26A and thereby into outlet passageway 6A. In the valve position shown, outlet passageway 6B is connected to through-bore 26B into cavity 10B and stepped through-bore portions 24 and 25 to connect to exhaust passageway 7B. Also in this position, exhaust passageway 7A is sealed from fluid connection to other passageways by land 9A on the dynamic plate 8. For reference purpose, the stationary plate 21, as shown in FIG. 1, has a directional arrow indicator adjacent to through-bore segments 24 and 25. This directional arrow will be used to reference the orientation of the plate in other examples shown in FIGS. 2, 3 and 4.

Figure 3A:
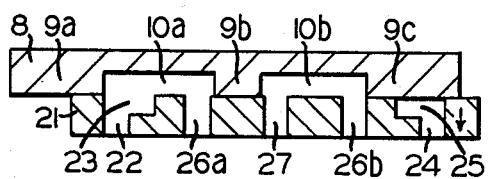
FIG. 3A, 3B, 3C are diagrammatic cross-sectional representation of the relative positions of the stationary plate and movable plate for three different valve positions, as shown in 3A, 3B and 3C, respectively. The relative position of the stationary plate, as indicated by the reference arrow in each of the three diagrams of FIGS. 3A, 3B and 3C is downward.
Figure 4A:
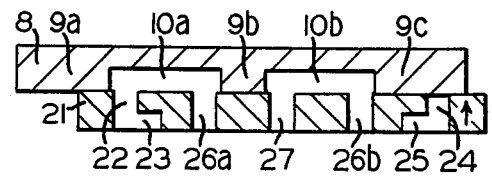
FIGS. 4A, 4B, 4C shows three different valve positions corresponding to those shown in FIGS. 3A, 3B, 3C, but with the stationary plate in an upward orientation, as indicated by the reference arrow.
Figure 3B:
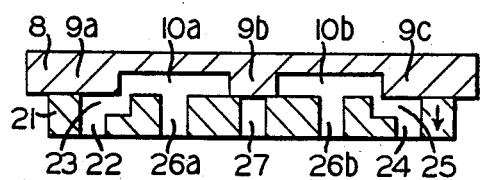
Figure 4B:
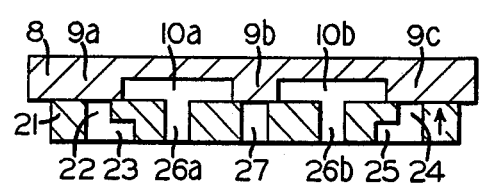

The valve shown in FIG. 1 can be described as a closed-center valve arrangement, in that in the "center" or "off" position, as shown in FIG. 4B, all of the inlet exhaust and outlet passageways would remain in sealed isolation. This type of valve, when used in the example of a bidirectional cylinder control, represents the desired "off" position which, in addition to controlling the cylinder in both directions, results in an axially locked cylinder actuator in the "neutral" or "off" position. Use of the stepped through bores in the stationary plate 21 permits the valve of FIG. 1 to be easily converted to an open or exhaust center position, as shown in FIG. 3B, merely by reversing the side of the stationary plate 21 that is ad3acent the dynamic plate 8. The reversing or flipping of the stationary plate 21 produces an alternate valve function in the center position using the same valve parts. As noted in FIG. 3, the stationary plate 21 has the reference arrow pointing downward. In modular-constructed control valves of the type shown in FIG. 1, the valve is readily disassembled so that the stationary plate 21 can be easily removed and reinserted in the inverse position.

As seen in FIG. 1, the stationary plate 21 has stepped through-bores on either end, 22 and 23, 24 and 25. The result of these stepped through-bores is that on one side of the plate, namely, the top side, the spacing between respective inlets and outlets is generally uniform. When the stationary plate 21 is reversed and the larger exhaust ports 23 and 25 are adjacent to the dynamic plate 8, the minimum space between respective outlet and exhaust passageways is greatly decreased and the adjacent respective land portion 9A, 9C is insufficient to seal the outlets from exhaust while the valve is in a center position.

Figure 2:
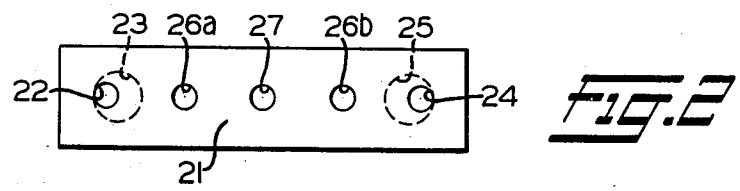
FIG. 2 is a plan view of a stationary plate generally as used in a valve of the type shown in FIG. 1.

FIG. 2 shows the increase in the stepped bore ports 23 and 25 in relationship to ports 22 and 24. FIG. 2 is a view of the stationary plate of FIG. 1 when viewed from the top side as shown in FIG. 1. As can be seen in FIG. 2, bores 26A, 26B and 27 are generally of uniform diameter. It is apparent from FIG. 2 that the minimum distance between the less than the minimum distance between the bore 26A and the narrow stepped bore portion 22. In a similar manner, the minimum distance between the wider stepped bore portion 25 and the through-bore 26B is much less than the minimum distance between the narrower stepped bore portion 24 and the through-bore 26B. The stationary plate 21, as shown, is rectangular in cross-section, but other designs that are generally symmetrical in their planar dimension can be used. Such other designs are those that can e inverted or flipped, and still provide proper orientation of the through-bores to the cavities in the dynamic plate 8.

Referring now to FIGS. 4, there is shown the relative positions of the stationary plate 21 and the dynamic plate 8 during the three valve positions 4A, 4B and 4C. FIG. 4A shows the dynamic plate 8 in a position corresponding to pressurization of the control pressure line 4B, such that the pistons of FIG. 1 would be moved to their leftward extreme. It can be seen in FIG. 4A that inlet bore 27 is connected to outlet bore 26B. While at the same time, outlet bore 26A is in fluid communication with exhaust stepped bore portions 22 and 23 by means of cavity 10A.

FIG. 4B shows the position of the dynamic plate 8 when no pressure is delivered to either control lines 4A and 4B or there is no pressure difference between 4A and 4B. The dynamic plate 8 is centered generally within the valve housing and the inlet port 27 is closed by means of land 9B. This is the closed-center position and all ports adjacent bores 22, 26A, 27, 26B and 24 are closed by respective lands 9A, 9B and 9C.

Figure 4C:
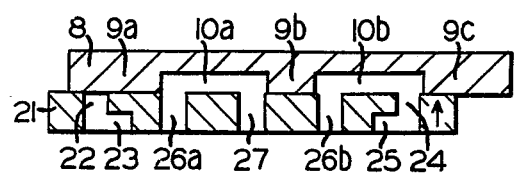

FIG. 4C shows the dynamic plate 8 in a rightward position corresponding to the pressurization of control line 4A, and in this position, the inlet bore 27 is in fluid connection with outlet bore 26A. Outlet bore 26B is connected to exhaust bore 24.

FIG. 3 shows corresponding valve positions to those of FIG. 4, but wherein the stationary plate 21 has been flipped and the orientation, as shown by the directional arrow, is downward. This selection of a downward orientation, placing the enlarged portions of the stepped bores adjacent the dynamic plate 8, results in the modification of the valve to an open or exhaust center function.

In FIG. 3A, the cavity 10A connects stepped bore 23 with outlet bore 26A. Inlet bore 27 is now connected to cavity 10B to outlet bore 26B.

FIG. 3B shows the center position of the valve corresponding to a lack of pressure in either control line 4A or 4B. While inlet bore 27 is blocked by land 9B, the cavities 10A and 10B, respectively, communicate the outlets 26A and 26B with the larger ports of stepped bores 23 and 25. This position corresponds to exhausting both outlet passageways during a "center" or "neutral" position of the control valve. This position, as shown in FIG. 3B, is in sharp contrast with the closed-center position of FIG. 4B. In this manner, the valve, as shown in FIG. 1, can be modified to be either an open-center (FIG. 3B) or a closed-center (FIG. 4B) valve. The only difference between the valve component parts in FIG. 3B and FIG. 4B is that the stationary plate 21 has been inverted. The reference arrow in FIG. 3B is directed downward while the reference arrow in FIG. 4B is directed upward.

Figure 3C:
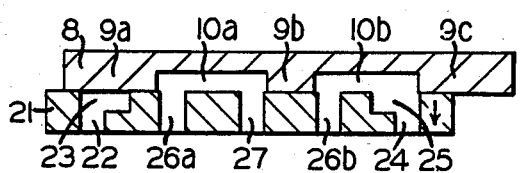

FIG. 3C shows the right position of the dynamic plate 8. The inlet port 27 is connected through cavity 10A to the outlet port 26A, while the outlet port 26B is connected through cavity 10B to the larger diameter or wider stepped bore portion 25.

In considering the presently preferred embodiment shown in the Figures, it is apparent that other styles of control valves having dynamic or slide plate portions can be adapted to utilize this invention by interposing a stationary plate between the slide plate and the pressure passageways. As shown in FIG. 1, there is no difficulty in using an enlarged stepped bore section when such enlarged bore section is not on the contacting side with the slide plate. The oversized or enlarged stepped bore portion in such arrangement with the slide plate causes the valving operation to be performed at an earlier period in the valve cycle and allows the valve arrangement to remain closed or exhausted, depending on the relative orientation of the stationary plate. In some embodiments, only a single cavity in the slide plate will be used, while in other embodiments, multiple cavities in the slide plate are used, such that pluralities of inlet and outlet ports can be interconnected. While certain presently preferred embodiments have been shown and illustrated, it is to be understood the invention is not limited thereto, but may be practiced in a variety of other embodiments within the scope of the following claims.

I claim:

1. A multiposition valve device comprising:
   (a) a housing;

(b) operating means for selectively positioning said valve device in selected valve positions;

(c) a dynamic plate having at least one cavity carried by said operating means for axial movement therewith;

(d) a plurality of fluid-carrying passageways in said housing connectable to fluid devices;

(e) a stationary plate mounted in said housing intermediate said passageways and said dynamic plate;

(f) said stationary plate having a plurality of through-bores;

(g) at least one of said through-bores having an enlarged diameter opening on one side of said stationary plate;

(h) said stationary plate being of a generally symmetrical design about the plane perpendicularly intersecting the axis of said through-bore, such that said stationary plate can be mounted in said housing with said enlarged diameter opening adjacent said dynamic plate, and alternatively with said enlarged diameter opening adjacent said passageways in said housing; and (i) at least portions of said one side of said stationary plate and the opposite side of said stationary plate having surfaces to provide slidable sealing with said dynamic plate.

2. The multiposition valve device of claim 1, wherein said stationary plate is of generally rectangular cross-section.

3. The multiposition valve device of claim 1, wherein said operating means includes a downwardly-opening channel engaging said dynamic plate.

4. The multiposition valve device of claim 1, wherein said at least one through-bore comprises a stepped through-bore having a larger and a smaller diameter opening on respective opposite sides thereof.

5. The multiposition valve device of claim 4, wherein said stationary plate is of generally rectangular cross-section.

6. The multiposition valve device of claim 1, wherein such valve is a three-position bidirectional control valve having two cavities in said dynamic plate, and wherein two of said through-bores are stepped having an enlarged diameter on one side of said stationary plate, arranged such that said stationary plate is mounted in said housing such that said stationary plate can be inverted to seal and alternatively connect said stepped bores from said two cavities as said operating means is in a center position.

7. The multiposition valve device of claim 6, wherein said stationary plate is of generally rectangular cross-section.

8. The multiposition valve device of claim 6, wherein said bidirectional control valve is fluid-operated.

9. The multiposition valve device of claim 6, wherein said operating means includes a downwardly-opening channel, and a stationary plate of generally rectangular cross-section.

10. A multifunction stationary valve plate for interfacing between a dynamic valve plate and connecting passageways in a valve housing, such stationary valve plate comprising:

(a) a plate member having a plurality of through-bores;

(b) at least one of said through-bores having respective larger openings on one side of said plate member;

(c) said one side of said plate member having a surface providing a slidable sealing surface; and (d) said plate member having on the side opposite said one side a second planar surface having a surface providing a slidable sealing surface.

11. The stationary valve plate of claim 10, wherein said plate member is generally symmetrical in the plane perpendicular to the axes of said through-bores.

12. The stationary valve plate of claim 11, wherein said plate member is of generally rectangular cross-section.

13. The stationary valve plate of claim 10, wherein at least two of said through-bores being stepped through-bores having respective larger openings on one side of said plate member.

14. The stationary valve plate of claim 13, wherein said plurality of through-bores comprises five through-bores arranged generally linearly-spaced on said plate member and said stepped through-bores are disposed at opposing ends of such linearly-spaced arrangement.

* * * * *